(12) United States Patent
DeBartolo, Jr. et al.

(10) Patent No.: US 6,484,360 B1
(45) Date of Patent: Nov. 26, 2002

(54) SELF-SECURING RACEWAY END CAP

(75) Inventors: Joseph DeBartolo, Jr., North Stonington, CT (US); Daniel Methot, Westford, MA (US)

(73) Assignee: Hubbell Incorporated, Orange, CT (US)

(*) Notice: Subject to any disclaimer, the term of this patent is extended or adjusted under 35 U.S.C. 154(b) by 0 days.

(21) Appl. No.: 09/559,276

(22) Filed: Apr. 27, 2000

(51) Int. Cl.[7] .............................. H02G 3/04; E04C 2/52
(52) U.S. Cl. .................. 16/95 R; 52/220.7; 174/48; 174/68.3; 248/216.4; 248/217.3
(58) Field of Search .............. 16/95 R; 52/220.7, 52/242, 290, 287.1, 288.1, 656.8, 456; 248/217.3, 216.4; 174/48, 49, 68.3

(56) References Cited

U.S. PATENT DOCUMENTS

| | | | | |
|---|---|---|---|---|
| 3,786,171 A | * | 1/1974 | Shira ........................... | 174/48 |
| 4,163,572 A | * | 8/1979 | Benscoter ..................... | 174/48 |
| 4,772,216 A | * | 9/1988 | Szymanek .................... | 439/234 |
| 5,206,972 A | | 5/1993 | Nudelmont et al. | |
| 5,560,169 A | | 10/1996 | Palmer | |
| 5,802,672 A | | 9/1998 | Rohder | |
| 5,921,028 A | * | 7/1999 | Marocco ....................... | 49/403 |
| 5,927,364 A | * | 7/1999 | Zacher et al. ................. | 52/456 |
| 5,942,724 A | * | 8/1999 | Russo et al. ................... | 174/48 |
| 5,981,872 A | * | 11/1999 | Decore et al. ................. | 174/48 |
| 5,986,212 A | * | 11/1999 | Lhota .......................... | 174/68.3 |
| 6,027,283 A | * | 2/2000 | Schweinnberg et al. ...... | 405/42 |
| 6,084,180 A | * | 7/2000 | DeBartolo, Jr. et al. ...... | 174/48 |
| 6,178,094 B1 | * | 1/2001 | Hakozaki ..................... | 174/49 |
| 6,199,321 B1 | * | 3/2001 | Ginzel .......................... | 49/27 |
| 6,274,814 B1 | * | 8/2001 | Iavarone ....................... | 174/48 |

OTHER PUBLICATIONS

Hubbell Premise Wiring Full Line Catalog, p. 1, 138, 139.

* cited by examiner

*Primary Examiner*—Anthony Knight
*Assistant Examiner*—Doug Hutton
(74) *Attorney, Agent, or Firm*—Tara L. Hoffman; Alfred N. Goodman (57) ABSTRACT

An end cap for engaging a raceway having an end wall portion and a gripping wall portion extending from the inner surface of the end wall portion at a first end of said gripping wall portion. A plurality of barbs extend from opposing surfaces of the gripping wall portion which engage the inner channel surface of the raceway to form a friction fit therewith. In a second embodiment, the plurality of barbs are progressively wider from the distal end of the gripping wall portion to its first end, allowing the end cap to be employed with various sized raceways.

29 Claims, 5 Drawing Sheets

SELF-SECURING RACEWAY END CAP

FIELD OF THE INVENTION

The present invention relates to a self-securing end cap for wire delivery systems, such as a raceway. In particular, upon insertion of the end cap on the terminal end of the raceway, a plurality of barbs extending from the end cap engage the inner surface of the raceway. The barbs provide a friction fit between the end cap and the raceway preventing the end cap from separating from the raceway.

BACKGROUND OF THE INVENTION

Wire delivery systems, such as raceways, are employed to hold and manage wires, such as voice, data, and power wiring. Specifically, the raceway is mounted to a supporting surface, such as a wall or ceiling, and the raceway distributes the wires carried therein throughout a room. This provides efficient delivery and management of the wiring throughout a room while hiding the unattractive wires. End caps are employed to provide a closure element or cap at the point where the raceway ends, enclosing the wires held within the raceway delivery system.

Prior art end caps for raceways commonly include a threaded screw hole that accepts a screw that has been inserted through the sidewall of the raceway, thus securing the end cap to the raceway. Since the prior art end caps require the use of a separate fastener, such as a screw, costs are increased in employing the end cap. In addition, efficiency is decreased because the prior art end caps are not self-securing in the additional steps of inserting and tightening the screw are required for assembling the end cap onto the end of the raceway.

Another problem with prior art end caps is that a single end cap cannot be used with raceways that vary in their inner channel width. As a result, different end caps must be made to accommodate different sized raceways.

Examples of prior art end caps are disclosed in the following U.S. Pat. No. 5,206,972 to Nudelmont et al.; U.S. Pat. No. 5,560,169 to Palmer; and U.S. Pat. No. 5,802,672 to Rohder.

SUMMARY OF THE INVENTION

Accordingly, an object of the invention is to provide an improved end cap for a raceway that is cost effective and efficient to use.

Another object of the present invention is to provide an end cap that is self-securing with the raceway.

A further object of the present invention is to provide an end cap that is a one-piece unitary member that can be employed without the use of separate fasteners.

Yet another object of the present invention is to provide an end cap that can accommodate raceways that vary in their inner channel width.

The foregoing objects are basically attained by an end cap for engaging a raceway, comprising an end wall portion extending in a first direction, the end wall portion having an inner surface and an outer surface. A gripping wall portion extending from the inner surface of the end wall portion in a second direction, the gripping wall portion having a first surface and a second surface, the first surface and the second surface facing in opposing directions. A first securing member extending from the first surface of the gripping wall portion for engaging an inner perimeter surface of the raceway, the first securing member includes a plurality of first securing elements. A second securing member extending from the second surface of the gripping wall portion for engaging the inner perimeter of the raceway, whereby the first securing member and the second securing member form a friction fit with the raceway.

The foregoing objects are also attained by an end cap for engaging a raceway, comprising an end wall portion extending in a first direction, the end wall portion having an inner surface and an outer surface, and a sidewall. A gripping wall portion having opposing first and second surfaces and opposing first and second ends, the gripping wall portion extending in a second direction from the inner surface of the end wall portion at the first end of the gripping wall portion. A first securing member extending from the first surface of the gripping wall portion proximate the sidewall of the end wall portion, the first securing member tapering from the first end to the second end of the gripping wall portion for engaging an inner perimeter surface of the raceway. A second securing member extending from the second surface of the gripping wall portion, the second securing member tapering from the first end to the second end of the gripping wall portion for engaging the inner perimeter surface of the raceway, whereby the first securing member and the second securing member form a friction fit with the raceway.

The foregoing objects are also attained by a raceway assembly, comprising a raceway having a base for attaching to a support, a cover releasably attached to the base, and an inner perimeter surface defining an inner channel, the inner perimeter surface having a substantially flat and continuous inner portion, and the inner channel having a terminal end. An end cap releasably engaging the raceway at the terminal end. The end cap including an end wall portion extending in a first direction and having inner and outer surfaces. A gripping wall portion received in the inner channel of the raceway, extending from the inner surface of the end wall portion in a second direction. A first securing member extending from the gripping wall portion, engaging the inner portion of the raceway forming a friction fit therewith preventing the end cap from separating from the raceway.

By designing the end cap in this fashion, it can be secured to the end of a raceway without the need of a separate fastener, reducing costs and increasing efficiency. In addition, then end cap can be employed with various sized raceways.

Other objects, advantages and salient features of the invention will become apparent from the following detailed description, which taken in conjunction with the annexed drawings, discloses preferred embodiments of the invention.

BRIEF DESCRIPTION OF THE DRAWINGS

Referring to the drawings which form a part of this disclosure.

DETAILED DESCRIPTION OF THE INVENTION

Referring to FIGS. 1–6, a raceway assembly 10, according to the present invention, comprises a raceway 12 and an end cap 14. Raceway 12 is employed to efficiently deliver wires, such as voice, data, and power wiring, through out a room. Typically, the raceway 12 is mounted to a wall or support surface 16 usually near the floor 17 of the room. End cap 14 is applied to raceway 12 at the point at which it ends, forming a friction fit with raceway 12, thereby enclosing any wires held therein.

Figure 1:
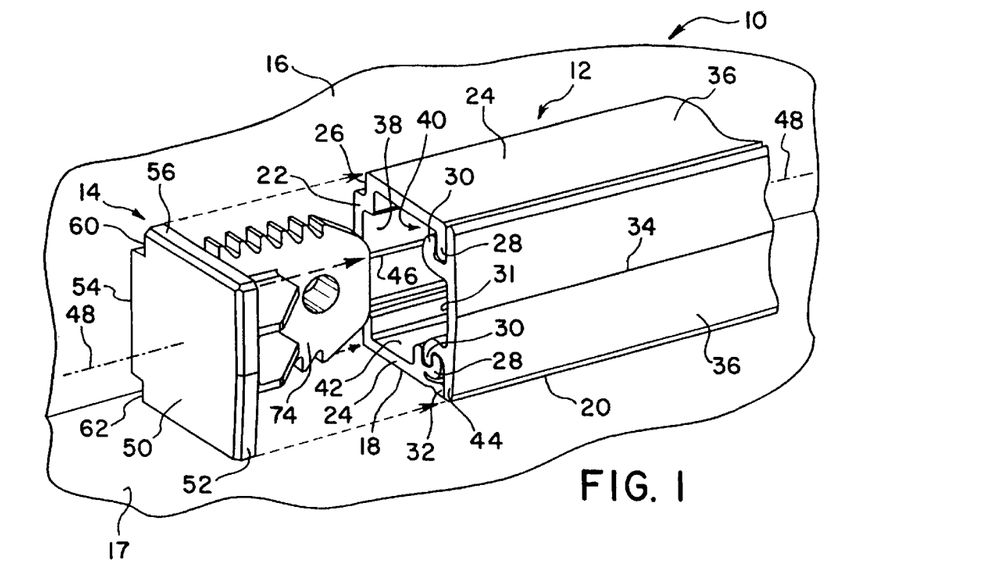
FIG. 1 is a front-side perspective view of an end cap and a raceway according to a first embodiment of the present invention, illustrating the end cap being assembled with the raceway.
Figure 2:
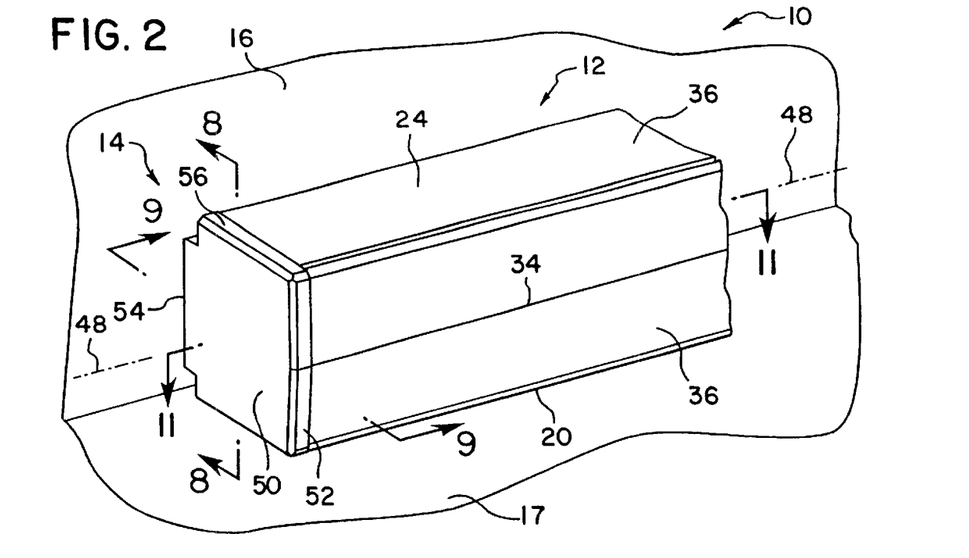
FIG. 2 is a front-side perspective view of the end cap and the raceway illustrated in FIG. 1, but showing the end cap fully assembled with the raceway.
Figure 3:
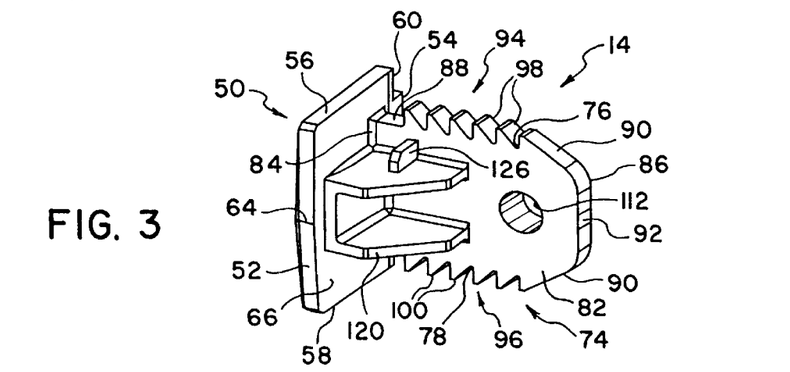
FIG. 3 is an front-side perspective view of the end cap illustrated in FIG. 1.
Figure 4:
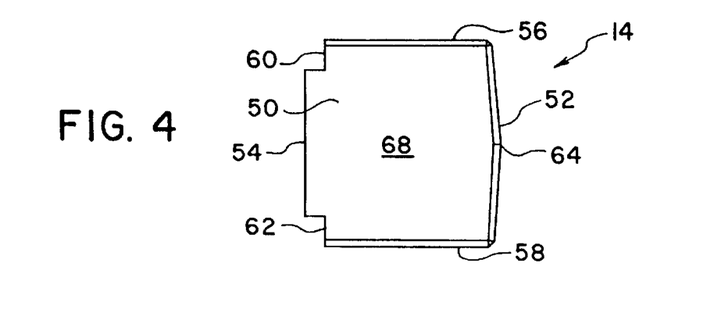
FIG. 4 is an right side view of the end cap illustrated in FIG. 1.
Figure 5:
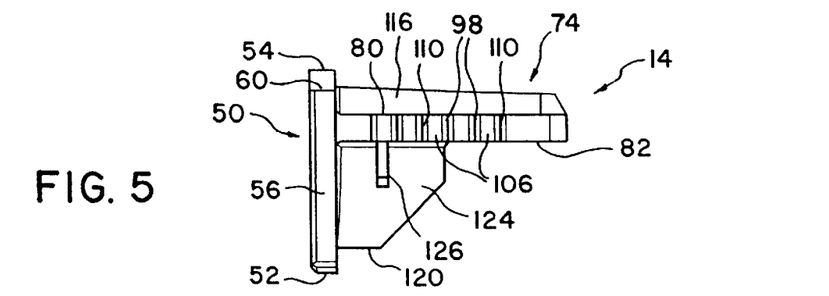
FIG. 5 is an top side view of the end cap illustrated in FIG. 1.
Figure 6:
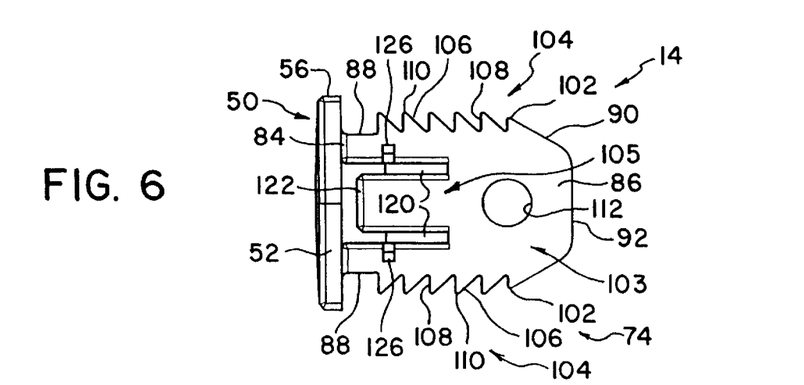
FIG. 6 is an front-side view of the end cap illustrated in FIG. 1.

Raceway 12 can include a base 18 and a separably attached cover 20, forming an enclosure for holding the wiring, where a back wall 22 of base 18 is attached to wall 16. Any wall of raceway 12 can be attached to wall 16, as long as access can be gained to the interior of raceway 12 through cover 20. Also, raceway 12 is preferably formed of a plastic material. Base 18 can also includes two sidewalls 24 extending substantially perpendicularly from opposing ends of back wall 22, with each of sidewalls 24 having a stepped section 26. Sidewalls 24 can further include inwardly extending hook elements 28 that engage corresponding hook elements 30 on cover 20. Specifically, hook elements 30 can extend from an inner surface 31 of cover 20 and engage hook elements 28 of base 18 upon closing cover 20 onto base 18, as best seen in FIG. 1, releasably attaching cover 20 to base 18. Cover 20 can be connected to base 18 or separate and can either be hinged to base 18 at hinge 32 or hinge 32 can be eliminated. A bend, as shown by bend line 34, is formed in cover 20 merely to facilitate the manufacturing process of raceway 12.

Base 18 and cover 20 of raceway 12 form an outer perimeter surface 36 that is preferably elongated and rectangular, but that can be more circular or square, as long as back wall 22 can be mounted to wall 16. An inner channel 40 is also formed by an inner perimeter surface 38 of raceway 12, having a width 41 transverse to the longitudinal length of raceway 12, which holds the wires to be delivered. Inner perimeter surface 38 has a substantially flat and continuous portion 42 which directly engages end cap 14, when end cap 14 is inserted into a terminal end 44 of raceway 12 along the direction of axis 48, as will be described in detail below. Inner perimeter surface 38 also includes a fastener guide line 46 on back wall 22 that provides a guide to an installer when mounting raceway 12 on wall 16.

As seen in FIGS. 1–6, end cap 14 includes an end wall portion 50 extending in a first direction with a gripping wall portion 74 extending from end wall portion 50 in a second direction. End wall portion 50 abuts terminal end 44 of raceway 12 upon inserting end cap 14 into raceway 12. End wall portion 50 includes opposing front and back sidewalls 52 and 54, and opposing top and bottom sidewalls 56 and 58 that extend between front and back walls 52 and 54 forming a substantially square wall portion. It is preferable that end wall portion 50 have a shape corresponding to the shape of the cross-sectional shape of raceway 12, however, end wall portion 50 can be of various shapes, such as polygonal or circular shapes.

Each of top and bottom sidewalls 56 and 58 include stepped sections 60 and 62 which correspond to stepped sections 26 of raceway 12. A central bend 64 is also included in end wall portion 50 to match bend line 34 of raceway 12. End cap 14 further has substantially planar inner and outer surfaces 66 and 68 where inner surface 66 abuts terminal end 44 upon inserting end cap 14 into raceway 12. Although it is preferable to include stepped sections 60 and 62 and central bend 64 on end wall portion 50 to match those corresponding elements of raceway 12, it is not necessary to include these elements. Sidewalls 52, 54, 56, and 58 can be either flush with outer perimeter surface 36 or extend beyond outer perimeter surface 36.

End cap 14 also includes a gripping wall portion 74 extending from inner surface 66 of end wall portion 50 for engaging inner portion 42 of raceway 12. Gripping wall portion 74 includes opposing first and second surfaces 76 and 78 and opposing substantially planar third and fourth surfaces 80 and 82. Gripping wall portion 74 further includes opposing first and second ends 84 and 86. First end 84 is attached to inner surface 66 of end wall portion 50 and is defined by flat sections 88 formed on each of first and second surfaces 76 and 78, respectively. Second end 86 is remote from first end 84 and is defined by tapered sections 90 of each of first and second surfaces 76 and 78, respectively, with an end wall 92 extending therebetween. Although it is preferable that gripping wall portion 74 be tapered at its second or distal end for facilitating insertion of the end cap 14, tapered sections 90 are not necessary tapered, and can be, for example, planar.

First and second securing members 94 and 96 extend from first and second surfaces 76 and 78 of gripping wall portion 74, respectively, and between first and second ends 84 and 86 for engaging raceway 12. Each of first and second securing members 94 and 96 have a plurality of first and second securing elements 98 and 100, respectively.

First and second securing elements 98 and 100 comprise of a first pair of barbs 102 and a plurality of remaining pairs of barbs 104. Barbs 102 and 104 extend outwardly from first and second surfaces 76 and 78, for directly engaging inner perimeter surface 38 of raceway 12 to form a friction fit therewith. Specifically, the first pair of barbs 102 include one barb extending from first surface 76 of gripping wall portion 74 and another barb extending from second surface 78 across from and opposite the first barb, forming a first width 103 across gripping wall portion 74. The first pair of barbs 102 are located near second end 86 of gripping wall portion 74 prior to tapered section 90, and are smaller than the remaining pairs of barbs 104 in that they do not extend out as far from gripping wall portion 74 as the remaining pairs of barbs 104 do. Each of the remaining pairs of barbs 104 extend from first and second surfaces 76 and 78 by substantially the same amount and form a second width 105 across gripping wall portion 74. This design of gripping wall portion 74 facilitates insertion of end cap 14 into raceway 12 by allowing end cap 14 to be partially inserted before barbs 104 meet resistance by inner perimeter surface 38 of raceway 12.

Each of barbs 102 and 104 particularly include a first or front converging surface 106 and a second or rear converging surface 108 that meet at an end surface 110 such that barbs 102 and 104 are substantially V-shaped. However, it is not necessary that barbs 102 and 104 be V-shaped, but rather can be of various shapes. For example, end surface 110 can be planar or curved and/or front and rear converging surfaces 106 and 108 can be substantially parallel rather than converging; In addition, the plurality of barbs 102 and 104 can be combined into one element forming one substantially flat or curved end surface extending from each of first and second surfaces 76 and 78.

Gripping wall portion 74 further includes a third securing member or fastener hole 112 that can receive a fastener or screw 114. Fastener hole 112 provides an additional way of securing end cap 14 to raceway 12 if desired. However, only barbs 102 and 104 are necessary for securing end cap 14 to raceway 12, thus fastener hole 112 can be eliminated.

A support rib 116 extends from third surface 80 of gripping wall portion 74 along the length of gripping wall portion 74. The primary function of support rib 116 is to provide reinforcement and support for gripping wall portion 74 upon inserting and tightening screw 114 into to hole 112, thus preventing gripping wall portion 74 from collapsing. In addition, support rib 116 has an outer surface 118 that is tapered from first end 84 to second end 86 of gripping wall portion 74. Tapered outer surface 118 has two functions. First, tapered outer surface 118 adds to the friction fit formed between gripping wall portion 74 and inner perimeter surface 38 of raceway 12 when end cap 14 is inserted in raceway 12, as will be described below. Second, tapered outer surface 118 facilitates the molding process of end cap 14 by allowing end cap 14 to be easily removed from the mold.

Gripping wall portion 74 further includes two positioning ribs 120 extending from fourth surface 82, substantially perpendicularly to the length of gripping wall portion 74. Positioning ribs 120 are spaced from one another with a connecting wall 122 extending therebetween. Each of positioning ribs 120 has an outer surface 124 and reinforcing elements 126 disposed on their outer surfaces 124, respectively, where the reinforcing elements 126 bridge the third surface 80 of gripping wall portion 74 and the outer surfaces 124 of reinforcing elements 126. Positioning ribs 120 serve to center and position end cap 14 upon inserting end cap 14 into raceway 12, as will be described further below. Also, positioning ribs 120 provide additional reinforcement to gripping wall 74.

Although it is preferable to include support rib 116 and positioning ribs 120 with gripping wall portion 74, both can be eliminated, or the length of positioning ribs 120 can be reduced, or one positioning rib can be used instead of two.

Preferably, gripping wall portion 74 is formed as a unitary one-piece member, however, barbs 102 and 104, support rib 116, and positioning ribs 120 can be formed separably and integrally connected to gripping wall portion 74 by any known, suitable attachment. Similarly, it is preferable that end cap 14 be formed as a unitary one-piece member, however, as with gripping wall portion 74, end wall portion 50 and gripping wall portion 74 can be separably formed and integrally connected by any type of attachment. It is also preferably that end cap 14, in particular barbs 102 and 104, be formed of a material, which allows some flexibility, but that is also substantially rigid, such as plastic. Furthermore, although it is preferable that gripping wall portion 74 be oriented with respect to end wall portion 50 as described above, gripping wall portion can be oriented in any manner on end wall portion 50, as long as barbs 104 engage inner portion 42 of raceway 12 to form a friction fit.

Figure 7:
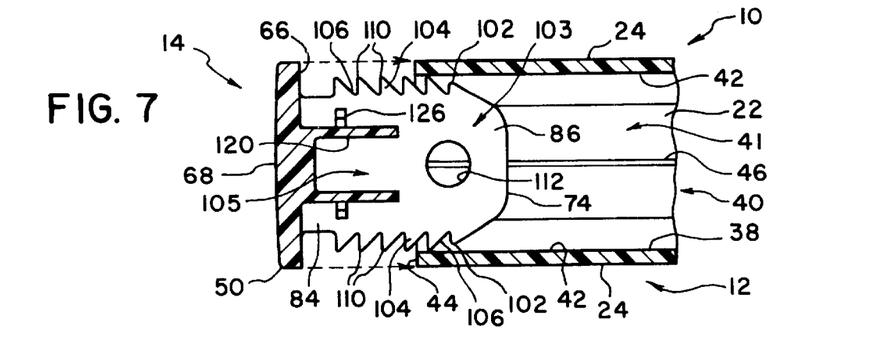
FIG. 7 is an cross-sectional side view of the end cap and the raceway illustrated in FIG. 1, showing the end cap partially inserted into the end of the raceway taken along a cross-sectional line similar to line 8—8 in FIG. 2.
Figure 8:
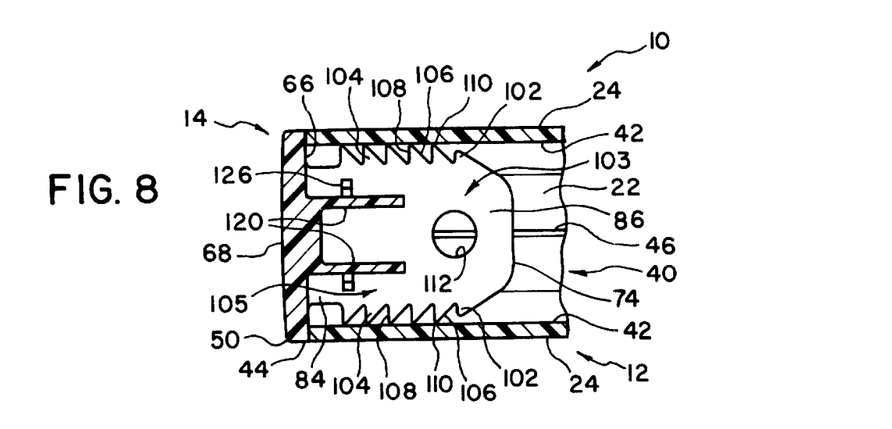
FIG. 8 is an cross-sectional view taken along line 8—8 in FIG. 2, showing the end cap engaged with the raceway.

Referring to FIGS. 1–12, upon assembling raceway 12 and end cap 14, end cap 14 forms a friction fit with inner perimeter surface 38 of raceway 12, preventing end cap 14 from separating from the terminal end 44 of raceway 12. Specifically, second end 86 of gripping wall portion 74 of end cap 14 is inserted into terminal end 44 of raceway 12 along axis 48. Since first width 103 of the first pair of barbs 102 is smaller than the width 41 of inner channel 40, barbs 102 clear and are spaced from inner perimeter surface 38 of raceway 12, as best seen in FIG. 7, facilitating insertion of end cap 14. End cap 14 can then be fully inserted into inner channel 40 such that end surfaces 110 of barbs 104 abut inner portion 42, as best seen in FIG. 8. Since second width 105 of barbs 104 is either the same as or slightly greater that width 41 of inner channel 40, the engagement of end surfaces 110 of barbs 104 with inner perimeter surface 38 forms a friction fit between end cap 14 and raceway 12. This allows end cap 14 to be used with raceways that have varying inner channel widths 41 which are either the same or less than the width 105 of barbs 104. For example, if width 41 of raceway 12 were smaller than width 105 of barbs 104 then barbs 104 would bend slightly back such that more of inner perimeter surface 38 of raceway 12 would abut the front converging surfaces 106 of barbs 104.

In addition, inner surface 66 of end wall portion 50 of end cap 14 abuts terminal end 44 of raceway 12 with front, back, top, and bottom sidewalls 52, 54, 56, and 58 of end wall portion 50 being flush with outer perimeter surface 36 of raceway 12. Likewise, stepped sections 60 and 62 of end wall portion 50 match and are flush with stepped section 26 of raceway 12. However, it is not necessary that end wall portion 50 be flush with outer perimeter surface 36 of raceway 12, as along as terminal end 44 abuts a surface of end wall portion 50 thus preventing end wall portion 50 from entering inner channel 40. For example, sidewalls 52, 54, 56, and 58 of end wall portion 50 can extend beyond outer perimeter surface 36, and stepped sections 60 and 62 can be eliminated. In addition, flanges (not shown) can be included on sidewalls 52, 54, 56, and 58 which would engage outer perimeter surface 36 when end cap 14 is inserted into raceway 12.

Figure 9:
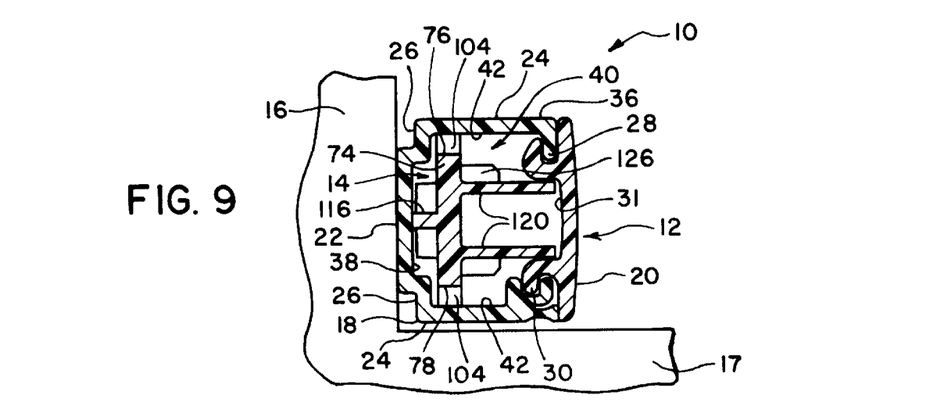
FIG. 9 is an cross-sectional view taken along line 9—9 in FIG. 2, showing the end cap engaged with the raceway.
Figure 10:
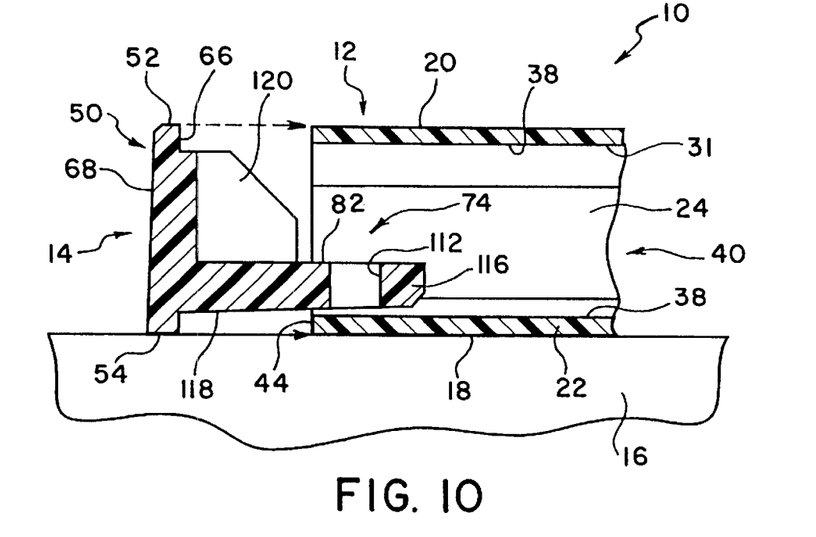
FIG. 10 is an cross-sectional top view of the end cap and the raceway illustrated in FIG. 1, showing the end cap partially inserted into the end of the raceway.
Figure 11:
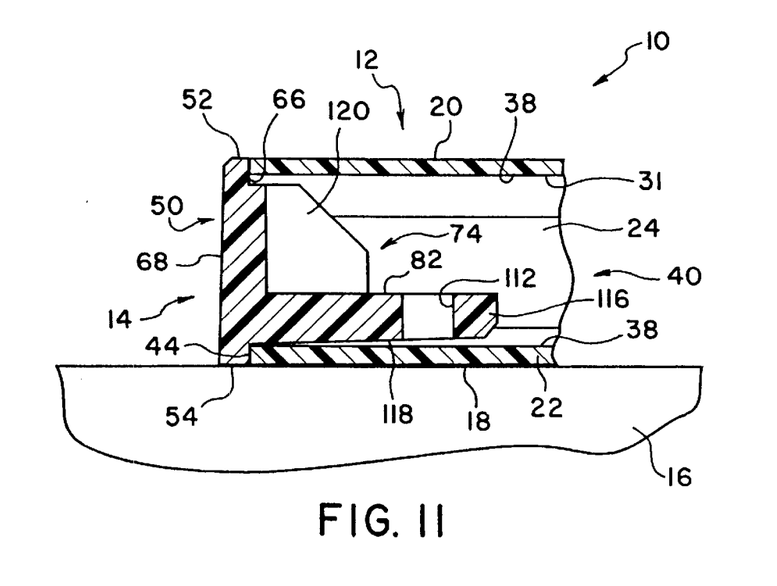
FIG. 11 is an cross-sectional view taken along line 11—11 in FIG. 2, showing the end cap engaged with the raceway.

As seen in FIG. 9, positioning ribs 120 are located between hook elements 30 of cover 20 of raceway 12, thus properly positioning gripping wall portion 74 and end cap 14 with respect to raceway 12. In addition, barbs 104 extend from first and second surfaces 76 and 78 of gripping wall portion 74 and engage inner perimeter surface 38 proximate the opposing sidewalls 24 of base 18. However, barbs 104 can engage inner perimeter surface 38 at any location. For example, by either shortening or eliminating positioning ribs 120, end cap 14 can be rotated 90 degrees such that barbs 104 engage inner perimeter surface 38 at back wall 22 of base 18 of raceway 12 and engage inner surface 31 of cover 20.

Figure 12:
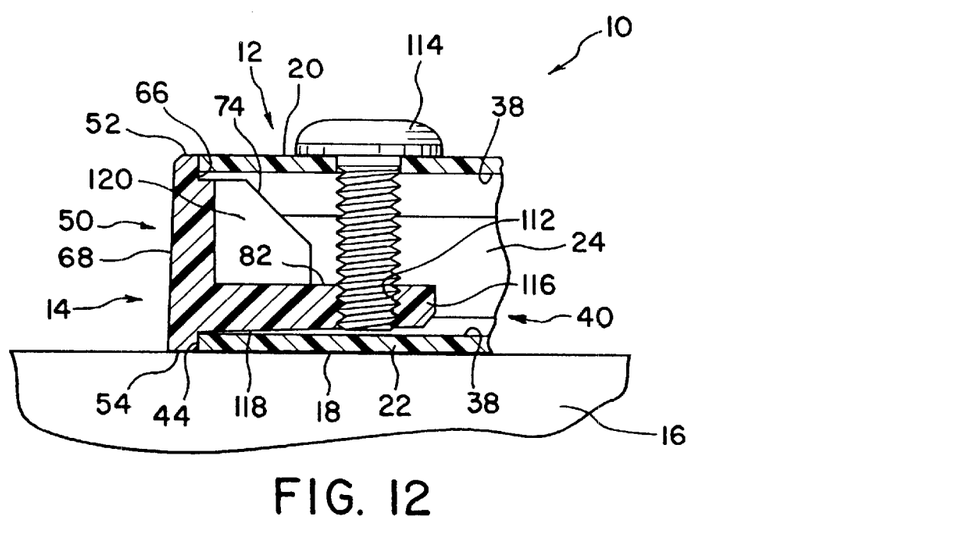
FIG. 12 is an cross-sectional view of the end cap and the raceway as illustrated in FIG. 11, but showing a screw fastened to the raceway and the end cap.

In addition, as seen in FIGS. 9–12, tapered outer surface 118 of support rib 116 allows end cap 14 to be easily inserted into inner channel 40 of raceway 12. Upon inserting end cap 14 into raceway 12, outer surface 118 of support rib 116 abuts inner perimeter surface 38 of raceway 12, thus adding to the friction fit between end cap 14 and raceway 12. Also, if desired, a screw 114 can be inserted through cover 20 and through fastener hole 112, which includes threads that mate with threads of screw 114, allowing screw 114 to be tightened, thereby providing additional securement of end cap 14 to raceway 12, as best seen in FIG. 12.

Figure 13:
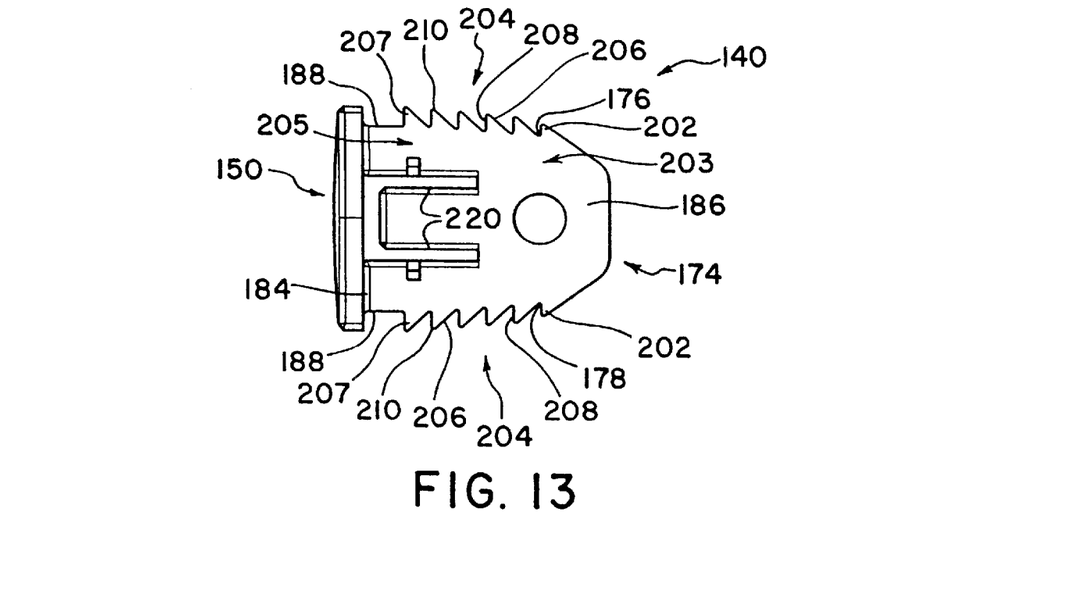
FIG. 13 is an front view of an end cap according to a second embodiment of the invention.

Referring to FIG. 13, a second embodiment of end cap 14, is disclosed as end cap 140, which has substantially the same elements as end cap 14 except barbs 204 taper such that they are progressively wider from second end 186 to first end 184 of gripping wall portion 174. Therefore, those elements which are the same in both the first and second embodiments will not be described with respect to the second embodiment.

As with end cap 14, end cap 140 includes an end wall portion 150 and a gripping wall portion 174 extending from end wall portion 150. Gripping wall portion 174 includes opposing first and second surfaces 176 and 178 and opposing first and second ends 184 and 186. A plurality of barbs 204 extend from each of first and second surface 176 and 178, respectively. Barbs 204 include a first pair barbs 202 proximate second end 186 and a last pair of barbs 207 proximate first end 184. Similar to end cap 14, each of barbs 202, 204, and 207 include a first or front converging surface 206 and a second or rear converging surface 208 that meet at an end surface 210 such that barbs 202, 204, and 207 are substantially V-shaped, where end surfaces 210 engage the inner perimeter surface of the raceway upon insertion of end cap 140 into the inner channel of the raceway.

Each barb 204 on first and second surfaces 176 and 178, respectively, is progressively wider than the previous barb from first end 184 to second end 186 of gripping wall portion 174, such that the first pair of barbs 202 have a first width 203 than is substantially smaller than the second width 205 of the last pair of barbs 207. In addition, flat sections 188 of first end 184 are spaced further from positioning ribs 220 than flat section 88 of the first embodiment end cap 14. This design of gripping wall portion 174 allows end cap 140 to be used with raceways that have varying inner channel widths 41 which are either the same, or less than width 205 of the last pair of barbs 207. For example, if the width of raceway 12 were smaller than width 205 of barbs 207 then barbs 207 would bend slightly back such that more of the inner perimeter surface of the raceway would abut the front converging surfaces 206 of barbs 207, and abut end surfaces 210 of the remaining barbs 204. Thus the barbs 204 are resilient to the extent necessary to create the desired friction fit, which can include bending of the barbs upon insertion into the raceway. In addition, the tapered design of barbs 202, 204, and 207 facilitates insertion of end cap 140 into the raceway, especially when using a raceway that has a relatively small inner channel width.

While particular embodiments have been chosen to illustrate the invention, it will be understood by those skilled in the art that various changes and modifications can be made therein without departing from the scope of the invention as defined in the appended claims.

What is claimed is:

1. An end cap for engaging a raceway, comprising:
   an end wall portion extending in a first direction, said end wall portion having an inner surface and an outer surface and first and second opposite sides extending between said inner and outer surfaces;
   a gripping wall portion extending from said inner surface of said end wall portion in a second direction, said gripping wall portion being located proximate said first side and remote from said second side and having a first surface and a second surface, said first surface and said second surface facing in opposing directions;
   a first securing member extending from said first surface of said gripping wall portion for engaging an inner perimeter surface of the raceway, said first securing member including a plurality of first securing elements;
   a second securing member extending from said second surface of said gripping wall portion for engaging the inner perimeter surface of the raceway; and
   a rib connected to each of said end wall portion and said gripping wall portion, respectively, for providing reinforcement to said gripping wall portion,
   whereby said first securing member and said second securing member form a friction fit with the raceway.

2. An end cap according to claim 1, wherein
said second securing member includes a plurality of second securing elements.

3. An end cap according to claim 2, wherein
said first and second securing elements are barbs.

4. An end cap according to claim 2, wherein
each of said first securing elements include separate first engaging surfaces, respectively; and
each of said second securing elements include separate second engaging surfaces, respectively.

5. An end cap according to claim 1, wherein
said gripping wall portion includes a third securing member.

6. An end cap according to claim 5, wherein
said third securing member is a fastener receiving aperture formed in said gripping wall portion.

7. An end cap according to claim 1, wherein
said first and second securing members are substantially coplanar with said gripping wall portion.

8. An end cap according to claim 1, wherein
said first and second securing members are removably coupled with the raceway.

9. An end cap according to claim 1, wherein
said gripping wall portion is a unitary member.

10. An end cap according to claim 1, wherein
said gripping wall portion includes a first end coupled to said end wall portion and a second end remote from said first end; and
each of said first and second securing members extend from proximate said first end to proximate said second end.

11. An end cap according to claim 1, wherein
said gripping wall portion includes a third surface extending between said first and second surfaces; and
said third surface being without a securing member extending therefrom.

12. An end cap according to claim 1, wherein
said gripping wall portion includes a third surface extending between said first and second surfaces; and
said third surface being spaced from the inner perimeter surface of the raceway.

13. An end cap according to claim 1, wherein
said rib is substantially perpendicular to each of said end wall portion and said gripping wall portion.

14. An end cap for engaging a raceway, comprising:
an end wall portion extending in a first direction, said end wall portion having an inner surface and an outer surface;
a gripping wall portion extending from said inner surface of said end wall portion in a second direction, said gripping wall portion having a first surface and a second surface, said first surface and said second surface facing in opposing directions;
a first securing member extending from said first surface of said gripping wall portion for engaging an inner perimeter surface of the raceway, said first securing member including a plurality of first securing elements;

a second securing member extending from said second surface of said gripping wall portion for engaging the inner perimeter surface of the raceway, whereby said first securing member and said second securing member form a friction fit with the raceway; and said gripping wall portion includes opposing first and second ends, and a third surface with a support rib extending from said third surface, said support rib being tapered from said first end to said second end.

15. An end cap according to claim 14, wherein said gripping wall portion includes a fourth surface and a positioning rib extending from said fourth surface.

16. An end cap for engaging a raceway, comprising:

an end wall portion extending in a first direction, said end wall portion having an inner surface and an outer surface, and a sidewall;

a unitary gripping wall portion having opposing first and second surfaces and opposing first and second ends, said gripping wall portion extending in a second direction from said inner surface of said end wall portion at said first end of said gripping wall portion;

a first securing member extending from said first surface of said gripping wall portion proximate said sidewall of said end wall portion, said first securing member tapering from said first end to said second end of said gripping wall portion for engaging an inner perimeter surface of the raceway; and a second securing member extending from said second surface of said gripping wall portion, said second securing member tapering from said first end to said second end of said gripping wall portion for engaging the inner perimeter surface of the raceway, whereby said first securing member and said second securing member form a friction fit with the raceway.

17. An end cap according to claim 16, wherein each of said first and second securing members include a plurality of first and second securing elements, respectively.

18. An end cap according to claim 17, wherein said first and second securing elements are barbs.

19. An end cap according to claim 16, wherein said gripping wall portion includes a fastener receiving aperture formed in said gripping wall portion.

20. An end cap according to claim 16, wherein said gripping wall portion is substantially flat.

21. An end cap according to claim 16, wherein said end cap is a unitary one-piece member.

22. An end cap according to claim 16, wherein said end cap is formed of a plastic material.

23. An end cap according to claim 16, wherein said gripping wall portion includes a first end coupled to said end wall portion and a second end remote from said first end; and each of said first and second securing members extend from proximate said first end to proximate said second end.

24. A raceway assembly, comprising:

a raceway having a base for attaching to a support, a cover releasably attached to said base, and an inner perimeter surface defining an inner channel, said inner perimeter surface having a substantially flat and continuous inner portion, and said inner channel having a terminal end; and an end cap releasably engaging said raceway at said terminal end, said end cap including, an end wall portion extending in a first direction and having inner and outer surfaces, a gripping wall portion received in said inner channel of said raceway, extending from said inner surface of said end wall portion in a second direction, and opposing first and second securing members extending from said gripping wall portion, each of said first and second securing members including a plurality of first securing elements and second securing elements, respectively, each of said first securing elements and each of said second securing elements engages said inner portion of said raceway forming a friction fit therewith preventing said end cap from separating from said raceway.

25. A raceway assembly according to claim 24, wherein said end wall portion includes a plurality of sidewalls, and said raceway includes an outer perimeter surface, said sidewalls of said end wall portion being substantially flush with said outer perimeter surface of said raceway at said terminal end.

26. A raceway assembly according to claim 24, wherein said gripping wall portion has opposing first and second ends and a support rib and that tapers from said first end to said second end, said support rib engaging said inner portion of said raceway.

27. A raceway assembly, comprising:

a raceway having a base for attaching to a support, a cover releasably attached to said base, and an inner perimeter surface defining an inner channel, said inner perimeter surface having a substantially flat and continuous inner portion, and said inner channel having a terminal end;

an end cap releasably engaging said raceway at said terminal end, said end cap including, an end wall portion extending in a first direction and having inner and outer surfaces, a gripping wall portion received in said inner channel of said raceway, extending from said inner surface of said end wall portion in a second direction, and a first securing member extending from said gripping wall portion, engaging said inner portion of said raceway forming a friction fit therewith preventing said end cap from separating from said raceway;

a second securing member extending from said gripping wall portion, engaging said inner portion of said raceway forming a friction fit therewith;

each of said first and securing members include a plurality of first and second securing elements, respectively; and said gripping wall portion includes opposing first and second ends, and each of said first and second securing elements are barbs, said barbs taper from said first end to said second end.

28. A raceway assembly, comprising:

a raceway having a base with first and second opposing walls and a cover with a third wall extending between said first and second walls, said first, second and third walls having an inner perimeter surface defining an inner channel of said raceway; and an end cap releasably engaging said raceway and including, an end wall portion extending in a first direction, said end wall portion having an inner surface and an outer surface and first and second opposite sides extending between said inner and outer surfaces, a gripping wall portion extending from said inner surface of said end wall portion in a second direction, said gripping wall portion being located proximate said first side and remote from said second side and having a first surface, a second surface, and a third surface extending therebetween with said first surface and said second surface facing in opposing directions, a first securing member extending from said first surface of said gripping wall portion engaging said inner perimeter surface of said raceway at said first wall, and a second securing member extending from said second surface of said gripping wall portion engaging said inner perimeter surface of said raceway at said second wall with said third surface of said gripping wall portion being without a securing member and being spaced from said inner perimeter surface of said raceway at said third wall.

29. A raceway according to claim 28, wherein a rib is connected to each of said end wall portion and said gripping wall portion, respectively, so that said rib is substantially perpendicular to each of said gripping wall portion and said end wall portion.

* * * * *